UNITED STATES PATENT OFFICE.

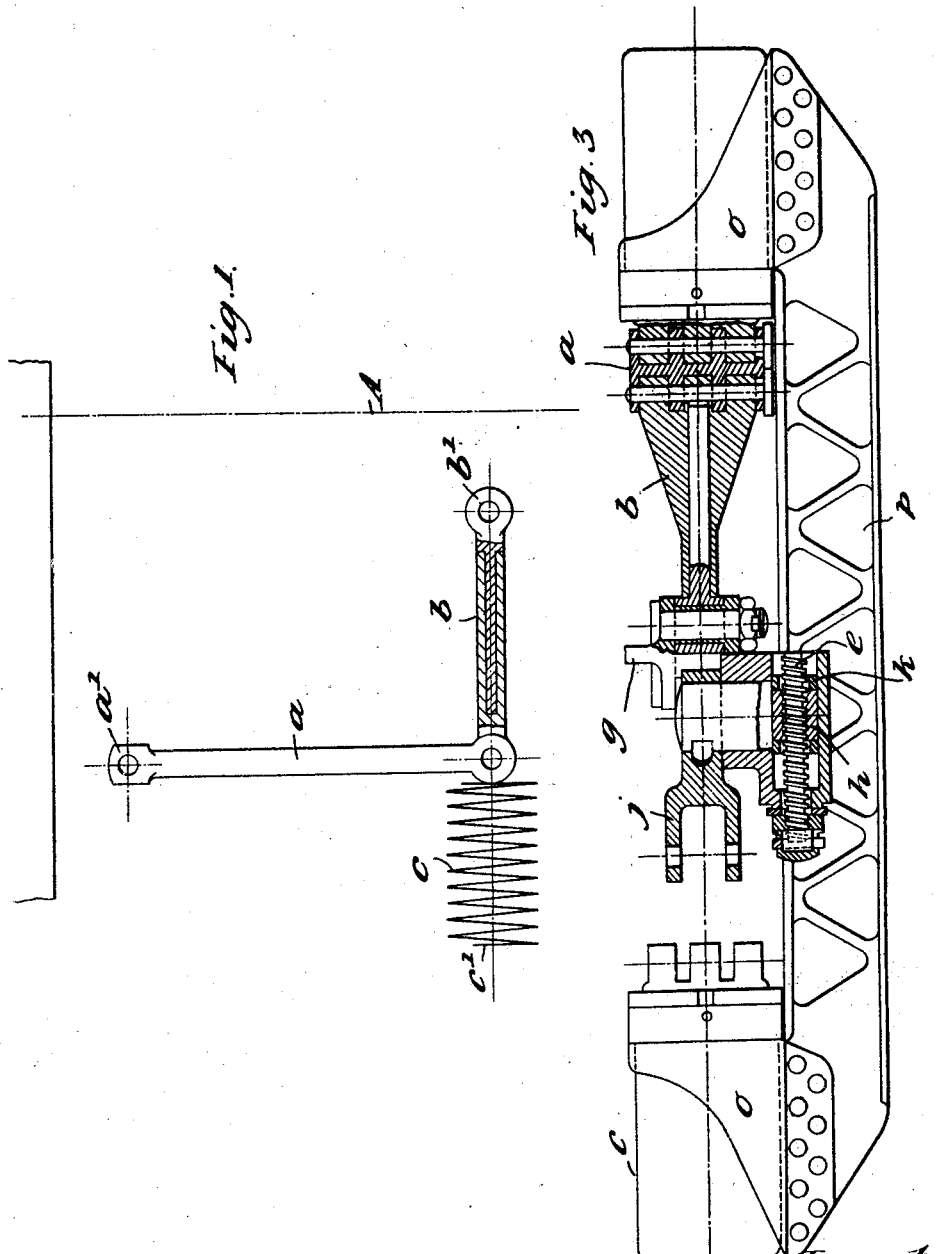

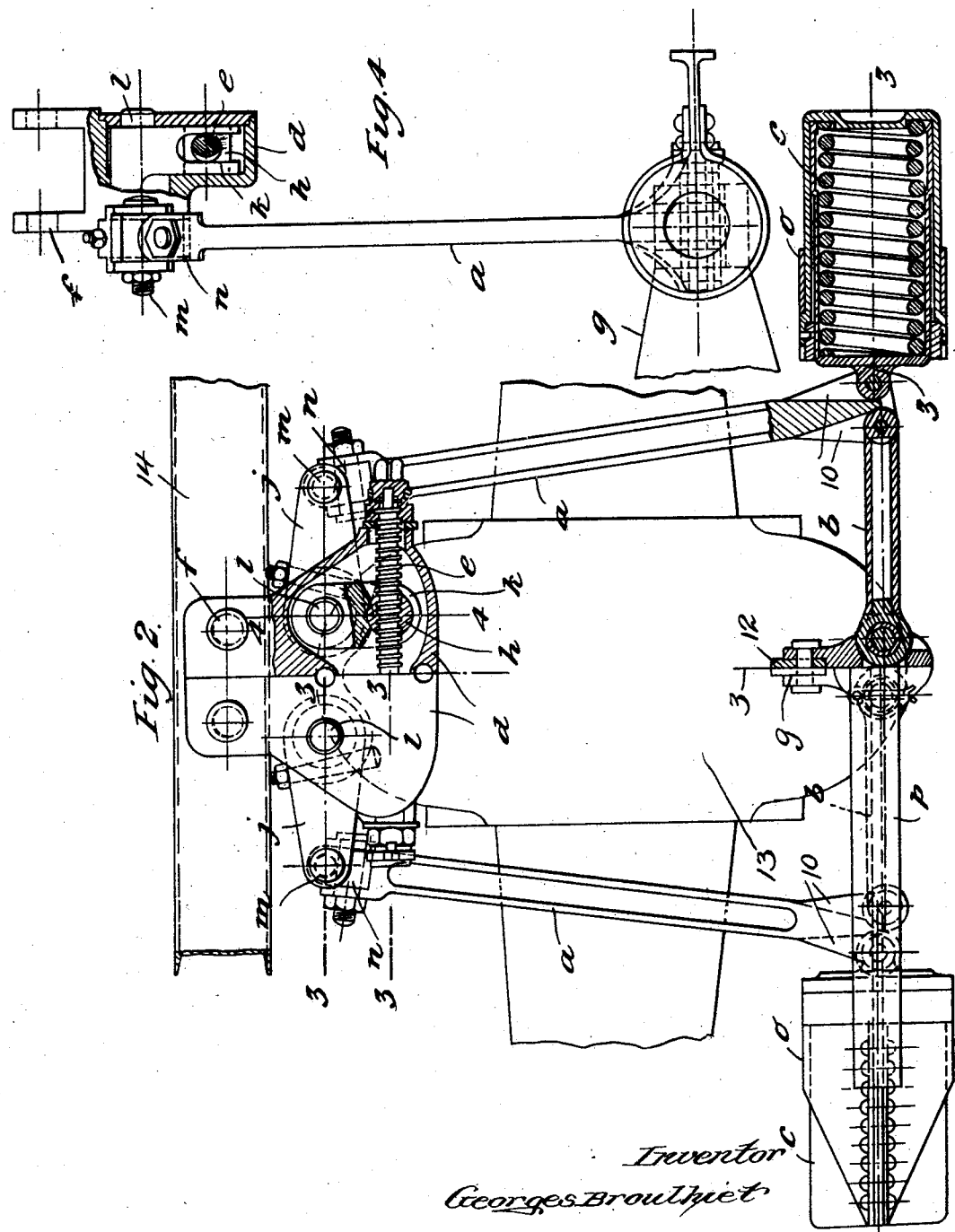

GEORGES BROULHIET, OF ST. ETIENNE, FRANCE.

SUSPENSION OF VEHICLES.

1,411,159.      Specification of Letters Patent.     Patented Mar. 28, 1922.

Application filed September 13, 1920. Serial No. 410,028.

*To all whom it may concern:*

Be it known that I, GEORGES BROULHIET, a citizen of the French Republic, residing in St. Etienne, Loire, France, have invented certain new and useful Improvements Relating to the Suspension of Vehicles, of which the following is a specification.

The invention consists in a suspension system for vehicles, in particular for automobiles, which allows of more easy running by increasing as required the duration of the oscillation of the body of the vehicle about its suspension, until this duration is sufficient to make the effort for damping the oscillation negligible. This result is attained by providing the vehicles with the usual springs having the smallest possible friction and also with apparatus for compensating these springs. This apparatus is connected on the one hand with the chassis of the vehicle and on the other hand with the axle. The system is completed by a third member which comprises a screw adapted to adjust the distance through which the chassis approaches or recedes from the axle under the action of a variable load. This member can be mounted, according to the construction of the vehicle, either on one of the ends of the suspension springs or on one of the ends of the compensating apparatus. The member serves either to adjust the apparatus to the distance between the chassis and the axle, an adjustment necessitated by the different amounts by which the springs are flexed under the variable load of the vehicle, or to maintain a constant distance between the axle and the chassis by adjusting the tension of the springs, the compensating apparatus having in this latter case a constant height. This member can have any suitable form of construction.

The accompanying drawings show an example of a construction according to the invention. Fig. 1 shows the compensating apparatus; Fig. 2 is a view of the arrangement, the left hand side being in elevation and the right hand side a section on a central line of a spring; Fig. 3 is a plan partly in section on the lines 3—3 of Fig. 2; Fig. 4 is a side view partly in section on the line 4—4 of Fig. 2.

The compensating apparatus shown in Fig. 1 comprises three essential parts, viz: a connecting rod $a$, a rod $b$ and a spring $c$. The apparatus is mounted between the chassis and the axle and is connected with them respectively by the end $a'$ of the rod $a$ and the end $b'$ of the rod $b$; the other ends of these rods are connected together. The apparatus can be repeated on the other side of the line A, which is a vertical from the axis of the vehicle.

The rod $a$ is approximately vertical and perpendicular to the rod $b$ in the mean position of the apparatus. The spring $c$ which is applied to the junction of the rods acts with considerable force in the direction of the rod $b$ when the vehicle is in the position of stable equilibrium on its suspension; this spring tends always to compress the rod $b$. The other end $c'$ of the spring is fixed relatively to the chassis. The rod $b$ comprises two parts sliding axially one within the other, so that the rod normally maintains a fixed length but can be lengthened if it is drawn out. This extensibility prevents the joints of the apparatus from being damaged by shocks when the road imparts to the axle a movement greater than that permitted by the geometric development of its members. The possible extension of the rod $b$ provides a safety arrangement when the inequalities of the road are greater than the travel intended for the apparatus and the spring $c$ is fully relaxed.

Figs. 2–4 show two compensating apparatus as described above disposed symmetrically in relation to a vertical plane passing through the axis of the vehicle, so as to balance the lateral thrusts. A casing $d$ is also disposed symmetrically with relation to the vertical plane passing through the axis of the vehicle. Within the casing are screws $e$ arranged horizontally and on either side of the central vertical plane of the casing. These screws engage with the internal threads of nuts $h$ fitted in the ends $k$ of a bellcrank lever $k$, $j$ pivoted at $l$, the free ends of the arms $j$ being pivoted at $m$ to the ends $n$ of the connecting rods $a$. The lower ends of the rods $a$ are provided with side flanges 10, a spring $c$ being pivotally attached to the outer flange of each rod, the inner flanges being pivotally connected to the rods $b$. The inner ends of the rods $b$ are pivotally connected to a yoke member $g$ which is bolted to a lug 12 on the axle housing 13 of the car. The casing $d$ is bolted at $f$ to the chassis member 14. The screw $e$ may be rotated by any suitable means, such as by a wrench applied to the squared end of said screw or by a flexible shaft of which one end is operated by the driver of the driver of the vehicle and the other end is secured to the squared end of said screw. The casings $o$ of the springs $c$ are connected by a girder or bar $p$.

Rotation imparted to the screw $e$ causes the arms $j$ and with them the rods $a$ to be raised or lowered in order to maintain the rods $b$ in a straight line at various loads of the vehicle.

The lateral thrusts of the adjusting screw $e$ balance so that the whole arrangement impresses on the chassis and on the axle reactions which are transmitted by the rods $a$ in an approximately vertical direction and which form the essential feature of the invention.

The housing of the axle carries with it the yoke $g$ and by its movement relatively to the chassis, causes the rods $b$ to take up an inclined position and under the pressure of the springs $c$ this inclination sets up components in the rods $a$, tending to effect the required results.

The casings $o$ of the springs $c$ are connected together by a journal $p$.

The same apparatus, as explained above, can be used without the regulating screw, in which case the upper ends of the rods $a$ can be pivoted directly to the rear cross bar of the chassis, and the casing $d$ is transferred to the ends of the springs of the vehicle.

Also, the adjustment can be obtained by aranging a screw between the axle and the yoke $g$, the essential feature being that the rods $b$ are restored to the direction in which the springs $c$ act as shown in Fig. 2, which is the stable position of equilibrium of the vehicle on its suspension.

Having thus described the nature of the said invention and the best means I know of carrying the same into practical effect, I claim:—

1. In a system of suspension for vehicles, a rod preferably composed of two axially movable parts, one end of said rod being adapted for connection with the axle of a vehicle, a connecting rod having one end connected to the other end of said first-named rod and its opposite end provided with means for connection with the chassis of a vehicle, said last-named rod being normally substantially perpendicular to said first-named rod, and a spring acting in the direction of the axis of said first-named rod for maintaining it in compression.

2. In a system of suspension for vehicles, a member having means for connection with the housing of an axle of a vehicle, a pair of rods pivoted to said member on opposite sides thereof so as normally to lie in the same horizontal line, a pair of springs adapted to maintain the rods in compression and other rods for pivotally connecting said first-named rods in compression with the chassis of the vehicle.

3. In a system of suspension for vehicles, a member having means for connection with the housing of an axle of a vehicle, a pair of rods pivoted to said member on opposite sides thereof so as normally to lie in the same horizontal line, a pair of springs adapted to maintain the rods in compression, casing for said springs and a member connecting said casings and other rods substantially at right angles to said first-named rods for connecting the outer ends of said rods with the chassis of the vehicle.

4. In a system of suspension for vehicles, a rod preferably composed of two axially movable parts, having means for connecting one of its ends with the axle of a vehicle, a connecting rod for connecting the other end of said rod with the chassis of the vehicle and normally substantially perpendicular to said first-named rod, a casing having means for attachment to the chassis of a vehicle, a bell crank lever pivoted in said casing and having one of its arms connected to said connecting rod, and a spring acting in the direction of the axis of said first-named rod and adapted to maintain it in compression.

5. In a system of suspension for vehicles, a rod preferably composed of two axially movable parts, having one of its ends provided with means for attachment to the axle of a vehicle, a casing for attachment to the chassis of the vehicle, a bell crank lever pivoted in said casing, a connecting rod connecting one end of said first-named rod with one arm of said bell crank lever, a nut in the other arm of said lever, a screw fixed in said casing adapted to engage with said nut and rotate said bell crank lever, and a spring acting in the direction of the axis of the said first-named rod to maintain it in compression.

6. In a system of suspension for vehicles, a member having means for connection with the housing of the axle of a vehicle, a pair of rods pivoted to said member on opposite sides thereof so as normally to lie in the same horizontal line, a pair of springs adapted to maintain the rods in compression, a casing having means for attachment to the chassis, a pair of bell crank levers pivoted in said casing, a pair of connecting rods connecting one end of each of said first-named rods with one arm of each of said bell crank levers, a nut in the other arm of each of said levers, and screws fixed in said casing adapted to engage with said nuts and rotate said bell crank levers.

In testimony whereof I have signed my name to this specification.

GEORGES BROULHIET. [L. S.]